United States Patent
Yoshida

(10) Patent No.: US 8,259,314 B2
(45) Date of Patent: Sep. 4, 2012

(54) IMAGE FORMING APPARATUS, IMAGE FORMING METHOD, AND COMPUTER PROGRAM PRODUCT

(75) Inventor: Tomoki Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1166 days.

(21) Appl. No.: 11/770,930

(22) Filed: Jun. 29, 2007

(65) Prior Publication Data

US 2008/0007794 A1 Jan. 10, 2008

(30) Foreign Application Priority Data

Jul. 4, 2006 (JP) .................................. 2006-184533

(51) Int. Cl.
*G06F 3/12* (2006.01)

(52) U.S. Cl. ..................... 358/1.13; 358/1.14; 358/1.15; 717/113; 717/120; 719/327; 719/328; 719/310

(58) Field of Classification Search .................. 358/1.13, 358/1.14, 1.15; 717/113, 120; 719/327–328, 719/310

See application file for complete search history.

(56) References Cited

U.S. PATENT DOCUMENTS

| | | | | |
|---|---|---|---|---|
| 5,467,181 A | * | 11/1995 | Doi | 399/364 |
| 5,995,712 A | * | 11/1999 | Doi | 358/1.2 |
| 6,020,971 A | * | 2/2000 | Kato et al. | 358/1.14 |
| 2002/0054326 A1 | * | 5/2002 | Morita | 358/1.15 |

FOREIGN PATENT DOCUMENTS

| | | |
|---|---|---|
| EP | 1170939 A2 * | 1/2002 |
| JP | 2002-084383 | 3/2002 |
| JP | 2006-107301 | 4/2006 |
| JP | 2006-155165 | 6/2006 |

OTHER PUBLICATIONS

Chinese Office Action and English Translation thereof.
Office Action dated May 31, 2011 for corresponding Japanese Patent Application No. 2006-184533.
Chinese Office Action and English Translation thereof. with mailing date of Jul. 7, 2009, and corresponding to the Chinese Patent Application No. 200710128709X.

* cited by examiner

*Primary Examiner* — Jacky X Zheng

(74) *Attorney, Agent, or Firm* — Harness, Dickey & Pierce, P.L.C.

(57) ABSTRACT

An image forming apparatus includes a plurality of functions related to an image forming process. The image forming apparatus includes a presentation layer, a logic layer, and a device layer. The presentation layer manages information received from a user and output for the user. Based on information received from the user in the presentation layer, the logic layer specifies a specific function from among the functions. The device layer controls the functions, and performs the specific function specified by the logic layer.

15 Claims, 10 Drawing Sheets

IMAGE FORMING APPARATUS, IMAGE FORMING METHOD, AND COMPUTER PROGRAM PRODUCT

CROSS-REFERENCE TO RELATED APPLICATIONS

The present document incorporates by reference the entire contents of Japanese priority document, 2006-184533 filed in Japan on Jul. 4, 2006.

BACKGROUND OF THE INVENTION

1. Field of the Invention

The present invention relates to an image forming apparatus, an image forming method, and a computer program product.

2. Description of the Related Art

A conventional multifunction product (MFP), which is an example of an image forming apparatus, includes functions of a printer, a copier, a facsimile machine, and a scanner, etc.

Some function provided by default in an MFP may not be useful for some user and such a user may require that function to be removed. Some user may require addition of a user specific function to the functions provided by default. That is, there is a need to add or remove functions to the MFP.

Japanese Patent No. 3679349 discloses an MFP that has a software configuration in which applications for implementing multiple functions are installed on a versatile operating system (OS). Such configuration has made it easier to add or remove functions to MFPs.

For example, if a screen layout is to be changed, a user interface related to display also needs to be changed accordingly. Furthermore, logic that interprets settings received from the user interface also needs to be changed. Thus, because the point of change is not localized, if a predetermined function is changed, other functions also need to be changed.

SUMMARY OF THE INVENTION

It is an object of the present invention to at least partially solve the problems in the conventional technology.

According to an aspect of the present invention, an image forming apparatus that includes multiple functions related to an image forming process includes a presentation layer that manages information received from a user and information to be output for the user; a logic layer that specifies at least one specific function from among the functions based on the information managed by the presentation layer; and a device layer that controls the functions and performs the specific function.

According to another aspect of the present invention, a method of forming an image on an image forming apparatus that includes multiple functions related to an image forming process includes managing, in a presentation layer, information received from a user and information to be output for the user in; specifying, in a logic layer, at least one specific function from among the functions based on the information managed by the presentation layer; and controlling, in a device layer, the functions and performs the specific function.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
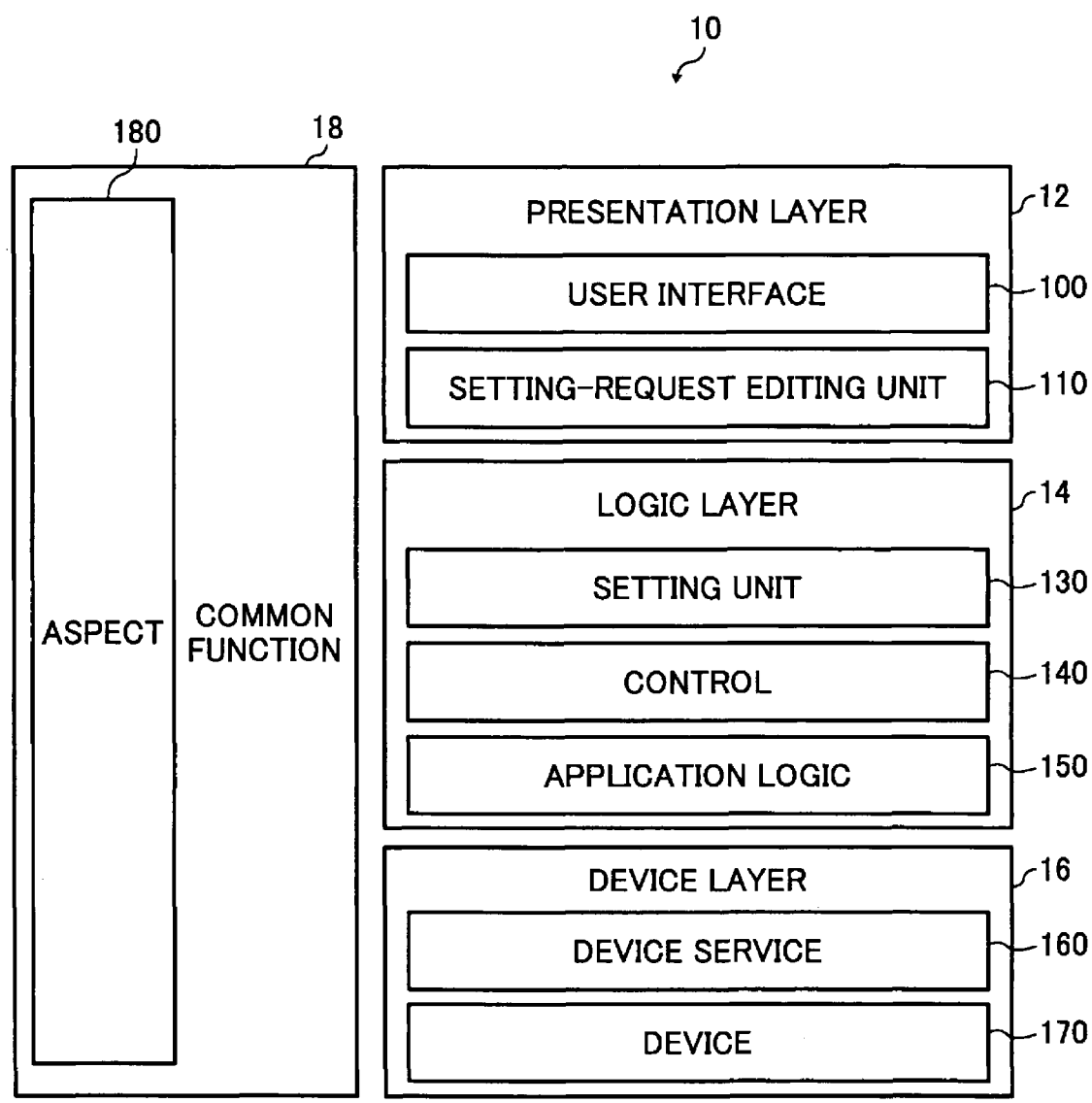
FIG. 1 is a block diagram of an MFP according to an embodiment of the present invention.

FIG. 1 is a block diagram of an MFP 10 according to an embodiment of the present invention. The MFP 10 includes software architecture that is divided into three layers: a presentation layer 12, a logic layer 14, and a device layer 16. Each layer includes a plurality of components. The MFP 10 includes a common function 18 commonly used by all the layers. The common function 18 includes an aspect 180. The presentation layer 12, the logic layer 14, and the device layer 16 are arranged in such a manner that even if change occurs in a process performed in each of the layers, the other layers are not affected.

The presentation layer 12 includes a user interface 100 and a setting-request editing unit 110. The logic layer 14 includes a setting unit 130, a control 140, and an application logic 150. The device layer 16 includes a device service 160 and a device 170.

The user interface 100 receives a request from a user or a service user of web service and the like. The logic layer 14 delegates execution of the request to the components of the logic layer 14.

The setting-request editing unit 110 edits the request received from the user interface 100 in a size acquired by the control 140. The setting-request editing unit 110 functions as a second editing unit.

The control 140 combines provided functions necessary for the request from the user interface 100. Each of the provided functions is a function of a single device such as reading and printing. The application logic 150 is a group of functions provided by the MFP 10, and includes functions such as receiving, transmitting besides reading and printing mentioned above.

The device service 160 is used by the application logic 150 as well. The device 170 performs device control for, for example, operating hardware and OS. Even if the OS or the hardware changes, wrapping is performed so that the layers mentioned above are not affected.

The aspect 180 handles logic that influences each component mentioned above such as access control, history, and accounting. The aspect 180 prevents concentration of change to the specification of the logic that occurs when each component is plugged in or customized.

Figure 2:
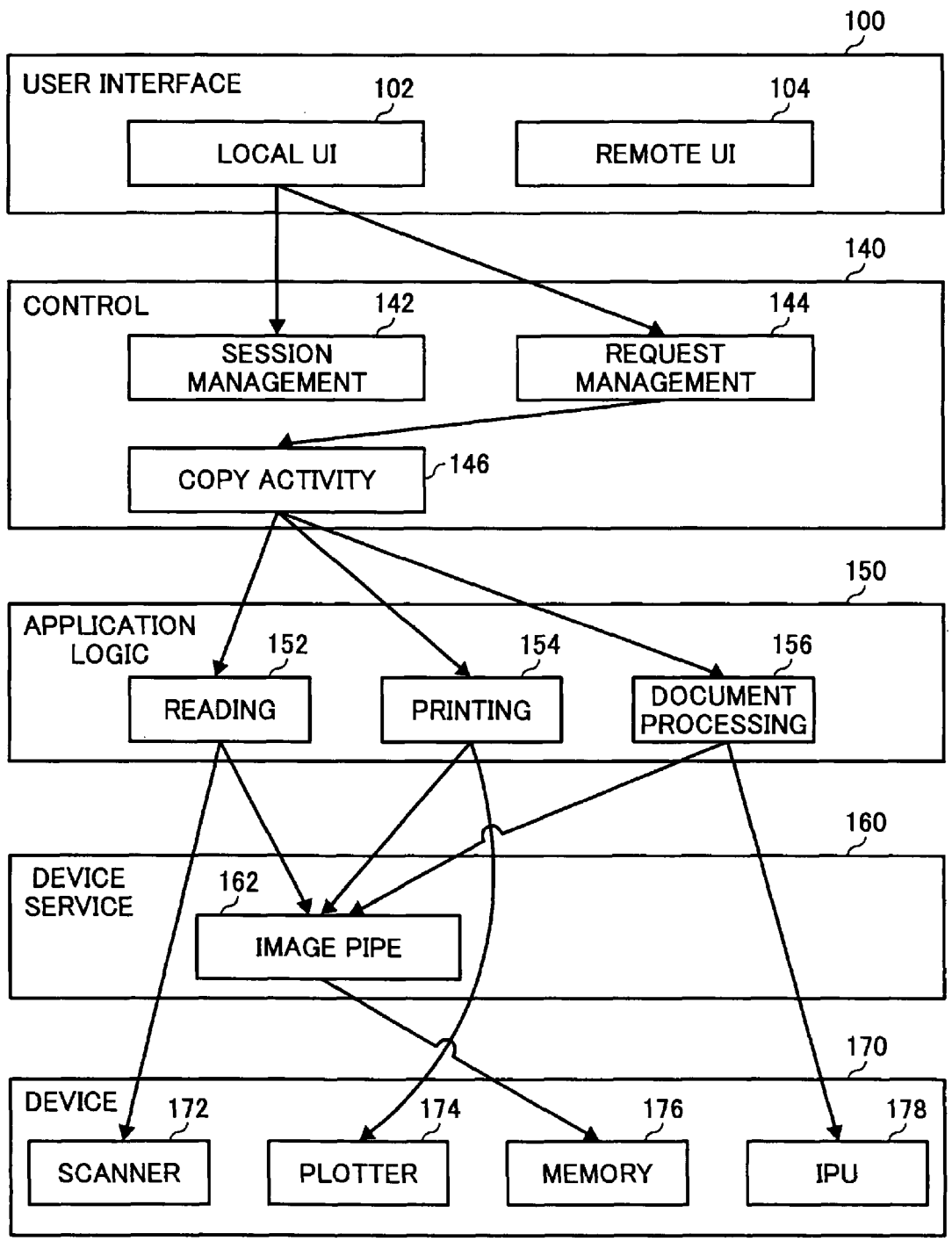
FIG. 2 is a schematic diagram for explaining a specific process performed by each component.

FIG. 2 is a schematic diagram for explaining a specific process performed by each component. Explained below is a process of copying. The user interface 100 includes a local user interface (UI) 102 and a remote user interface (UI) 104. When the local UI 102 receives a print request from a user, the local UI 102 sends the print request to a session management 142 and a request management 144 of the control 140.

The request management 144 combines activities to realize the user's request and generates a copy activity 146. An activity is a combination of the provided functions. The session management 142 has a function of associating the user with the activity from the time the user logs in until the time the user logs out.

The control 140 specifies functions related to the copy activity 146 from the application logic 150, specifically from a reading 152, a printing 154, and a document processing 156. The reading 152 sends address information read from a scanner or image identifying information such as handling ID to an image pipe 162 of the device service 160. The printing 154 records the image identifying information onto a transfer sheet. The printing 154 decides execution order of printing processes, and based on the order of priority, executes the printing processes.

The document processing 156 reads the image identifying information from the image pipe 162, which is a subcomponent of the device service 160, and sets processes such as data combine and reduce/enlarge in an image processing unit (IPU) 178 in the device 170. The IPU 178 is a data driver that controls an IPU-application specific integrated circuit (ASIC). Processed image identifying information is sent to the image pipe 162.

The image pipe 162 temporarily stores therein the image identifying information written from each of the subcomponents, that is, the reading 152, the printing 154, and the document processing 156. Whenever requested, the image pipe 162 sends the image identifying information.

According to an instruction from the reading 152, a scanner 172 in the device 170 operates to scan (read) a document, and according to an instruction from the printing 154, a plotter 174 operates to plot (print) the scanned document. Furthermore, according to an instruction from the image pipe 162, a memory 176 operates. According to an instruction from the document processing 156, the IPU 178 operates. Thus, the logic layer 14 operates in response to a request from the presentation layer 12.

A process performed by the setting unit 130 is described in detail below. The setting unit 130 divides or integrates a request acquired from the logic layer 14 to a size set by the application logic 150. Thus, it is possible to prevent influence of changes in the logic layer 14 on other layers.

Figure 3:
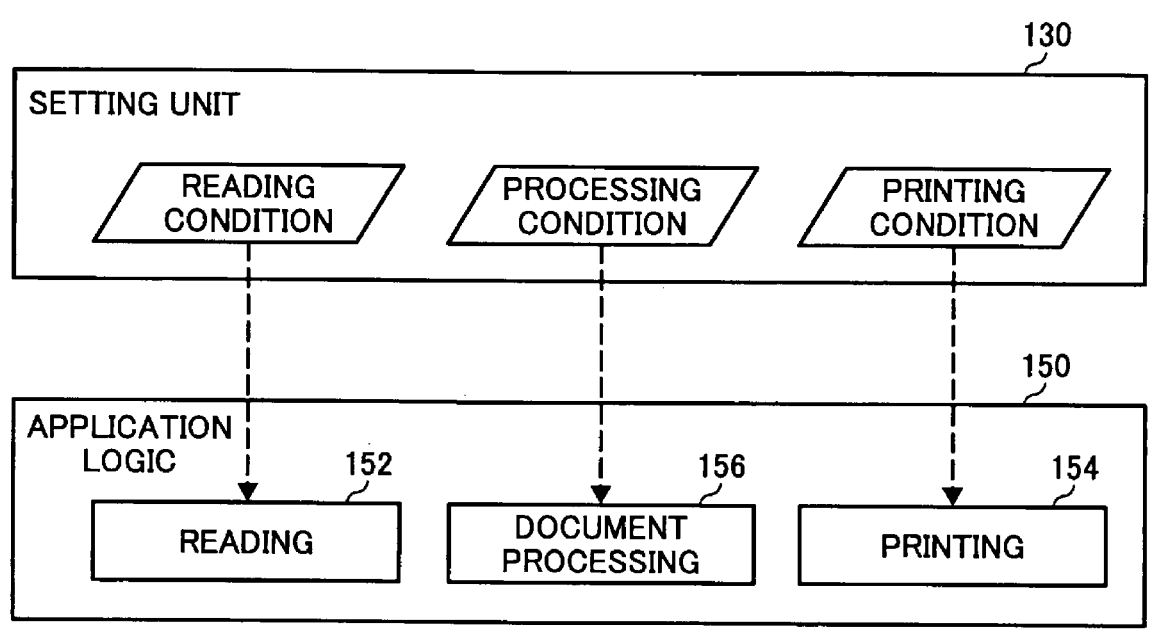
FIG. 3 is a schematic diagram for explaining a process performed by a setting unit shown in FIG. 1 that acquires separately a reading condition, a processing condition, and a printing condition.

FIG. 3 is a schematic diagram for explaining a process performed by the setting unit 130 when it receives document processing conditions separately. The setting unit 130 separately receives a reading condition, a processing condition, and a printing condition as document processing conditions, and processes those conditions. Those conditions are input by the user through the local UI 102. The reading condition, the processing condition, and the printing condition are of an equivalent size as that of the reading 152, the document processing 156, and the printing 154 of the application logic 150. Therefore, it is possible to set the conditions as they are to each of the subcomponents. The setting unit 130 functions as a first editing unit. The control 140 sets the document-operating conditions, divided or integrated by the setting unit 130, to each of the subcomponents. That is, the control 140 functions as a setting unit.

Figure 4:
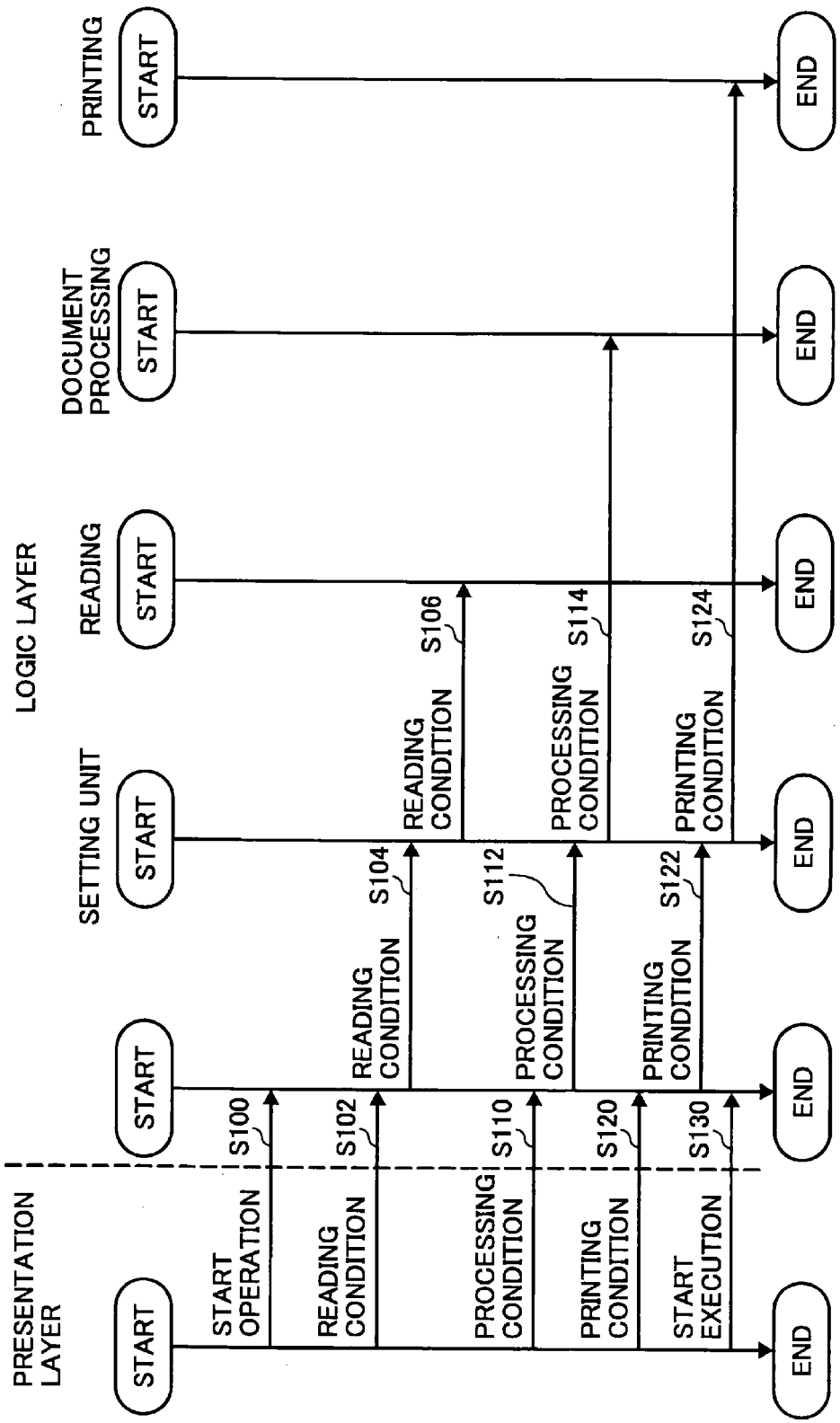
FIG. 4 is a sequence chart of the process shown in FIG. 3.

FIG. 4 is a sequence chart of the process shown in FIG. 3. When the user interface 100 receives an instruction to start operation, the user interface 100 sends that instruction to the logic layer 14 (step S100). When a reading condition is specified by the user, the presentation layer 12 instructs the logic layer 14 to set the reading condition (step S102). Subsequently, the reading condition is sent to the logic layer 14 and is set to the reading 152 through the setting unit 130 (steps S104 and S106).

When a processing condition is specified by the user, the presentation layer 12 instructs the logic layer 14 to set processing condition (step S110). Subsequently, the processing condition is set to the document processing 156 through the setting unit 130 (steps S112 and S114).

When a printing condition is specified by the user, the presentation layer 12 instructs the logic layer 14 to set printing condition (step S120). Subsequently, the printing condition is set to the printing 154 through the setting unit 130 (steps S122 and S124). Thereafter, an instruction is sent from the presentation layer 12 to the logic layer 14 to start execution (step S130).

Thus, if the condition input through the local UI 102 is a condition corresponding to each of the subcomponents of the application logic 150, each condition is set to the corresponding subcomponent.

Figure 5:
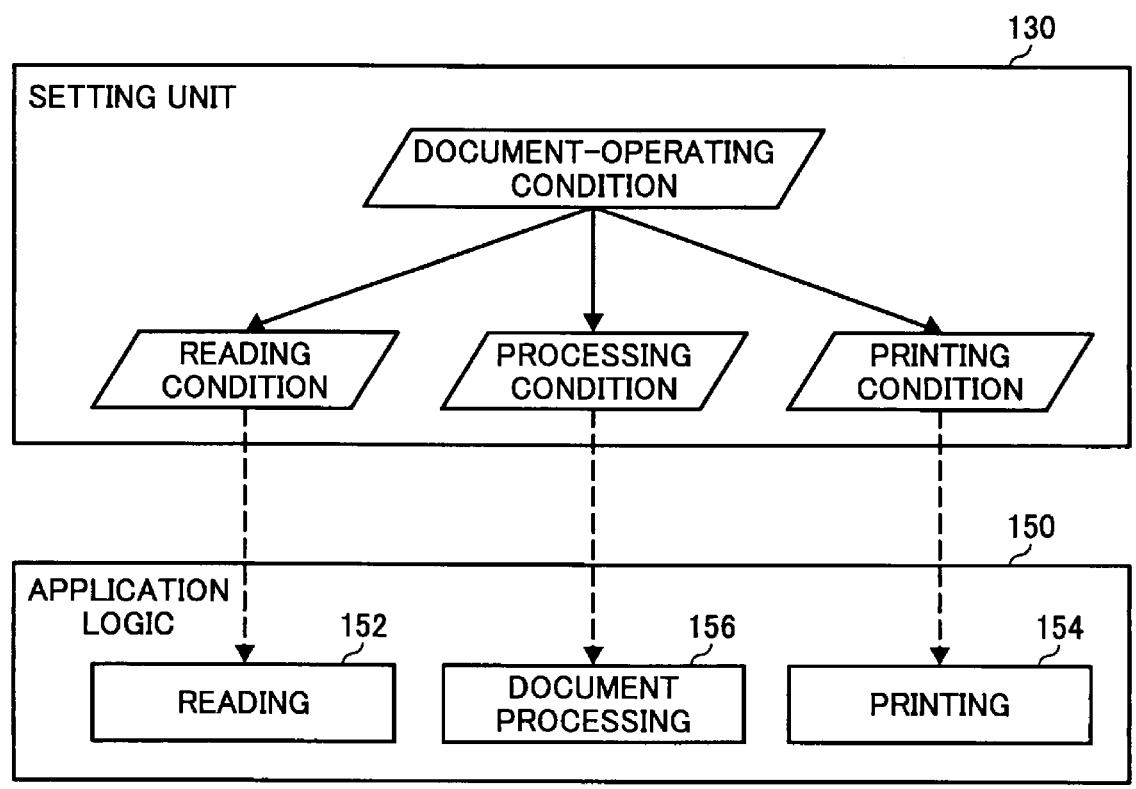
FIG. 5 is a schematic diagram for explaining a process of receiving a setting of a document-operating condition by a remote UI from the user.

FIG. 5 is a schematic diagram for explaining a process performed when the remote UI 104 receives a request to set a document-operating condition from a user. In such a case, the document-operating condition including a reading condition, a processing condition, and a printing condition is sent to the logic layer 14. The setting unit 130 divides the document-operating condition into each of the subcomponents of the application logic 150. Specifically, the setting unit 130 divides the document-operating condition into the reading condition, the processing condition, and the printing condition, and sets each of the conditions to the corresponding subcomponents.

Figure 6:
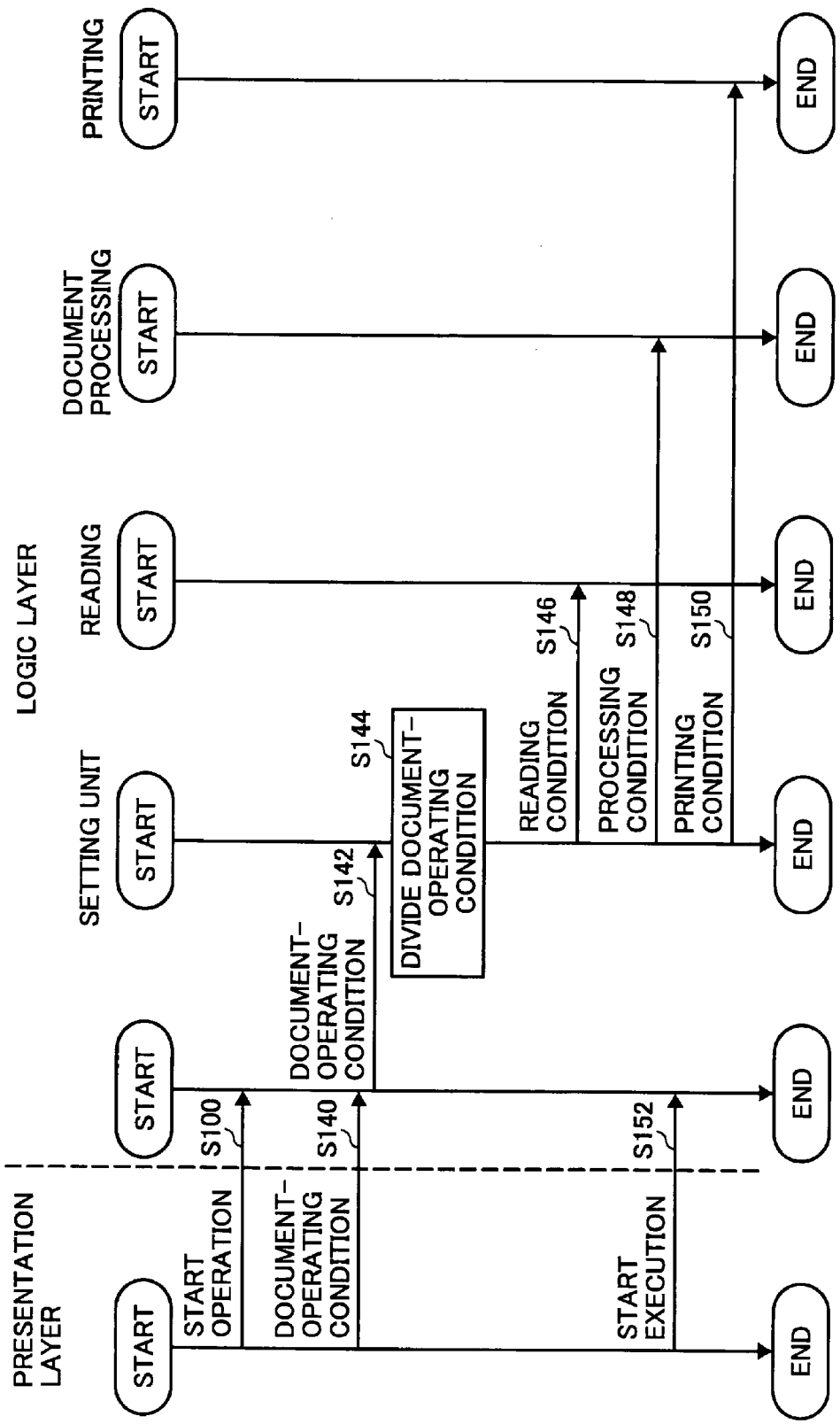
FIG. 6 is a sequence chart of the process shown in FIG. 5.

FIG. 6 is a sequence chart of the process shown in FIG. 5. When the user interface 100 of the presentation layer 12 receives an instruction from a user to start operation, the user interface 100 sends the instruction to the logic layer 14 to start operation (step S100). When a document-operating condition is specified by the user, an instruction is sent to the logic layer 14 to set the document-operating condition (step S140). According to the instruction, the setting unit 130 sets the document-operating condition by dividing it into a reading condition, a processing condition, and a printing condition (steps S142 and S144). The reading condition is set to the reading 152 (step S146), the processing condition is set to the document processing 156 (step S148), and the printing condition is set to the printing 154 (step S150). Thereafter, an instruction is sent from the presentation layer 12 to the logic layer 14 to start execution (step S152).

When a document-operating condition involving a plurality of components is input, the setting unit 130 divides the condition according to each of the subcomponents. That is, if the condition received by the setting unit 130 is larger than the size of the subcomponents of the application logic 150, the condition is divided into units of the subcomponents. Thus, it is possible to assimilate difference in size.

Even if the setting of the presentation layer 12 is changed, it is not necessary to change a structure of the logic layer 14. Thus, it is possible to change each of the functions with ease, and improve reusability.

In another example, when a set of a plurality of conditions included in input from a user corresponds to a single subcomponent, the setting unit 130 can combine the plurality of conditions.

The setting-request editing unit 110 of the presentation layer 12 divides or integrates conditions to be sent from the presentation layer 12 into a size suitable for the logic layer 14. Thus, any impact on the other layers due to a change and the like in the presentation layer 12 can be avoided. Process in the setting-request editing unit 110 is described in detail below.

For example, when the MFP 10 includes a four-line liquid crystal display (LCD) with a limited space for display, a user needs to input a plurality of setting conditions in an order while referring to contents of the display. For example, to obtain a document printed on both sides of a sheet from an original printed on one-side, the user needs to select a two sided button that instructs printing on both sides of the sheet. Then, the user needs to select a one sided-two sided button. When the user needs to obtain a left side of printed sheets bound, the user selects a bind-on-left button.

Figure 7:
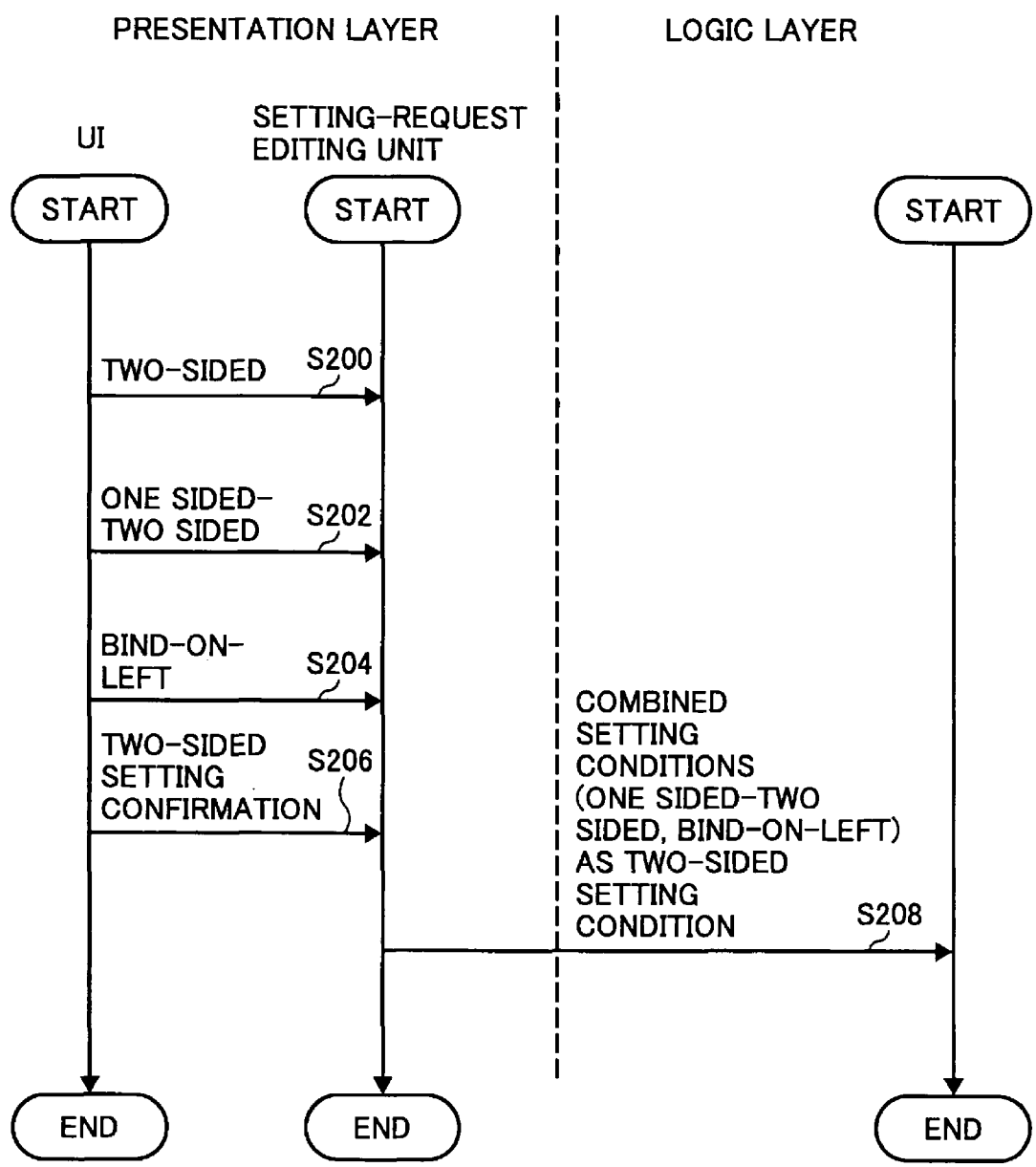
FIG. 7 is a sequence chart of a process corresponding to a four-line LCD.

FIG. 7 is a flowchart of a process performed by the setting-request editing unit 110 corresponding to the four-line LCD. As mentioned above, options of, two sided, one sided-two sided, bind-on-left are selected from a display screen, and are confirmed. Accordingly, a two-sided setting condition is sent to the setting-request editing unit 110 (step S200), a one sided-two sided setting condition is sent to the setting-request editing unit 110 (step S202), and a bind-on-left setting condition is sent to the setting-request editing unit 110 (step S204). Furthermore, two-sided setting confirmation is sent to the setting-request editing unit 110 (step S206). The setting-request editing unit 110 combines all these conditions, and sends one setting condition of two-sided printing to the logic layer 14 (step S208).

Figure 8:
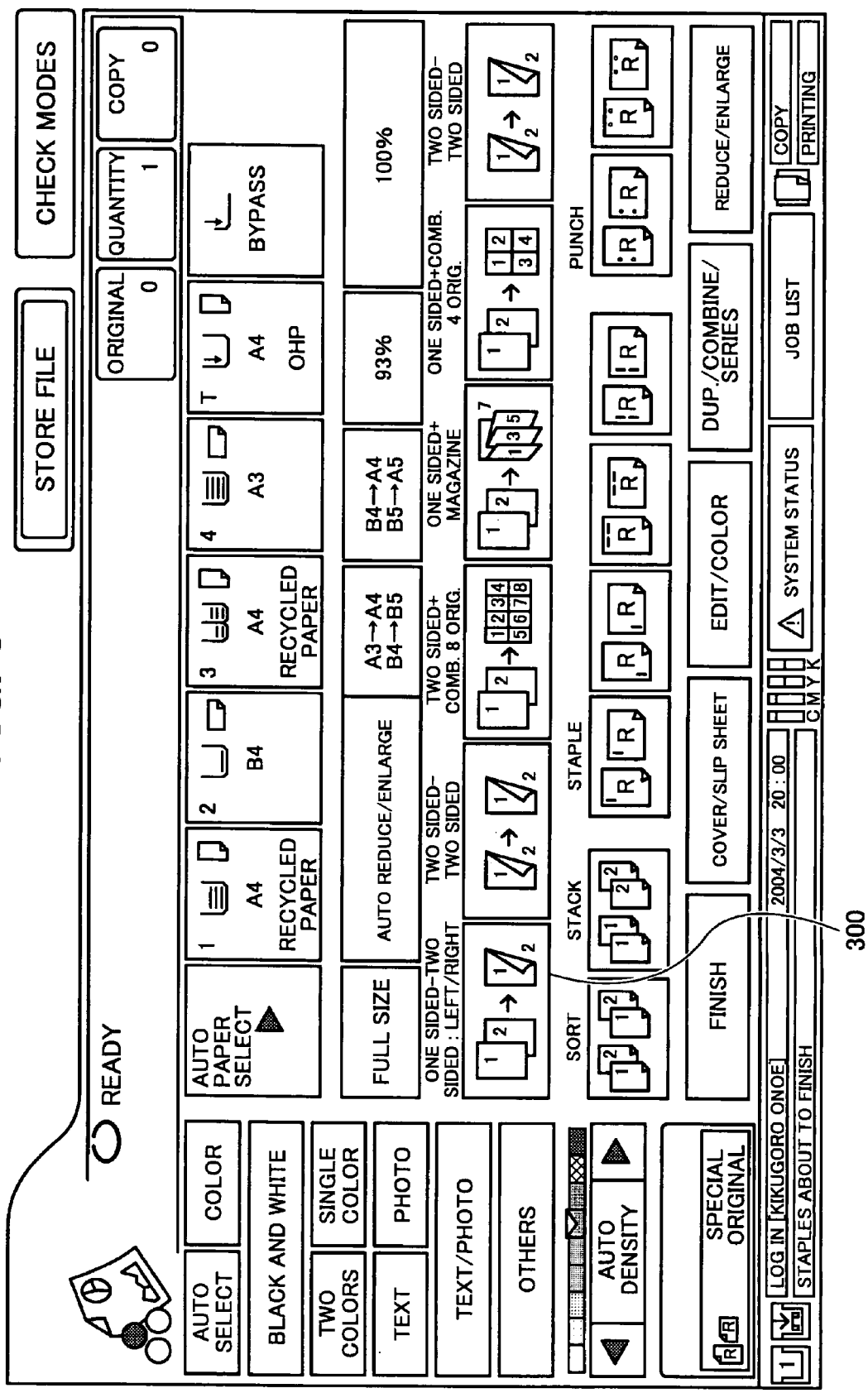
FIG. 8 is an example of display of a WVGA screen.

Explained below is the MFP 10 that includes wide video graphics array (WVGA). FIG. 8 is an example of display on a WVGA screen. On the WVGA screen, buttons each corresponding to a setting parameter are displayed. If the user is to input the setting conditions as mentioned above, the user can select a button 300. The button 300 is used to output two sided print of an original document printed on one-side, and to instruct to bind the print on left side.

Figure 9:
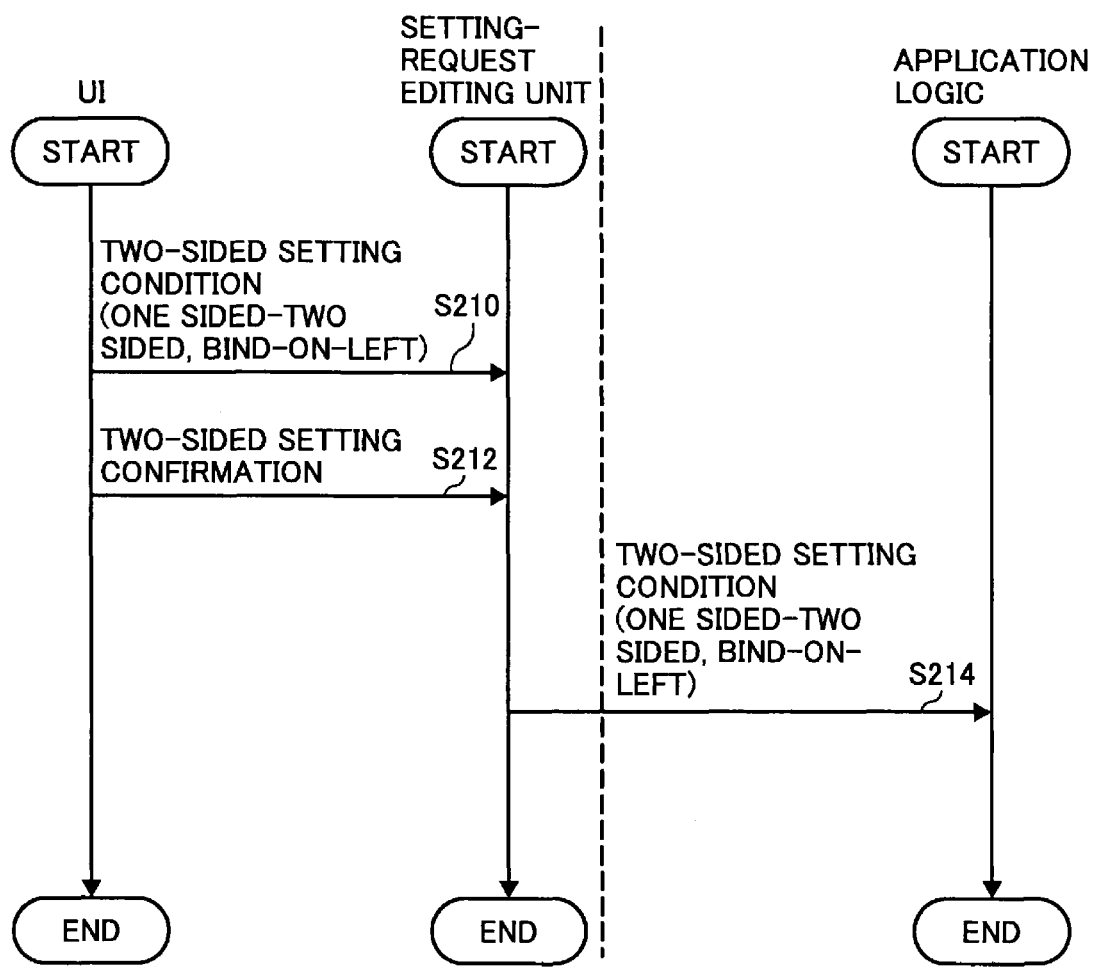
FIG. 9 is a sequence chart of a process corresponding to the WVGA screen.

FIG. 9 is a sequence chart of a process corresponding to the WVGA screen. When the button 300 on the screen is selected, and the setting is confirmed, a two-sided setting condition is sent to the setting-request editing unit 110, which instructs one sided-two sided printing with left binding (step S210). Two-sided setting confirmation is sent to the setting-request editing unit 110 (step S212). The setting-request editing unit 110 sends the two-sided setting condition to the logic layer 14 (step S214).

Thus, the setting-request editing unit 110 combines setting conditions specified through the four-line LCD, and edits the setting conditions in a form identical to the form of the setting conditions specified through the WVGA screen and to be sent to the logic layer 14. Thus, the setting-request editing unit 110 is able to assimilate the differences. Even if the screen structure or screen sequence changes, the structure of the logic layer 14 is not affected. Thus, it is possible to change each of the functions with ease, and improve reusability.

In still another example, when a setting condition input by the user is larger than units of the setting condition that is to be sent to the logic layer 14, the setting-request editing unit 110 can divide the setting condition into the units of the setting condition to be sent to the logic layer 14. For example, when the setting-request editing unit 110 is instructed through a button on the WVGA screen to set one sided-two sided setting, the condition is divided into one-sided reading and two-sided printing. The one-sided read setting is sent to the reading 152 in the application logic 150, and two-sided print setting is sent to the printing 154 in the application logic 150.

Figure 10:
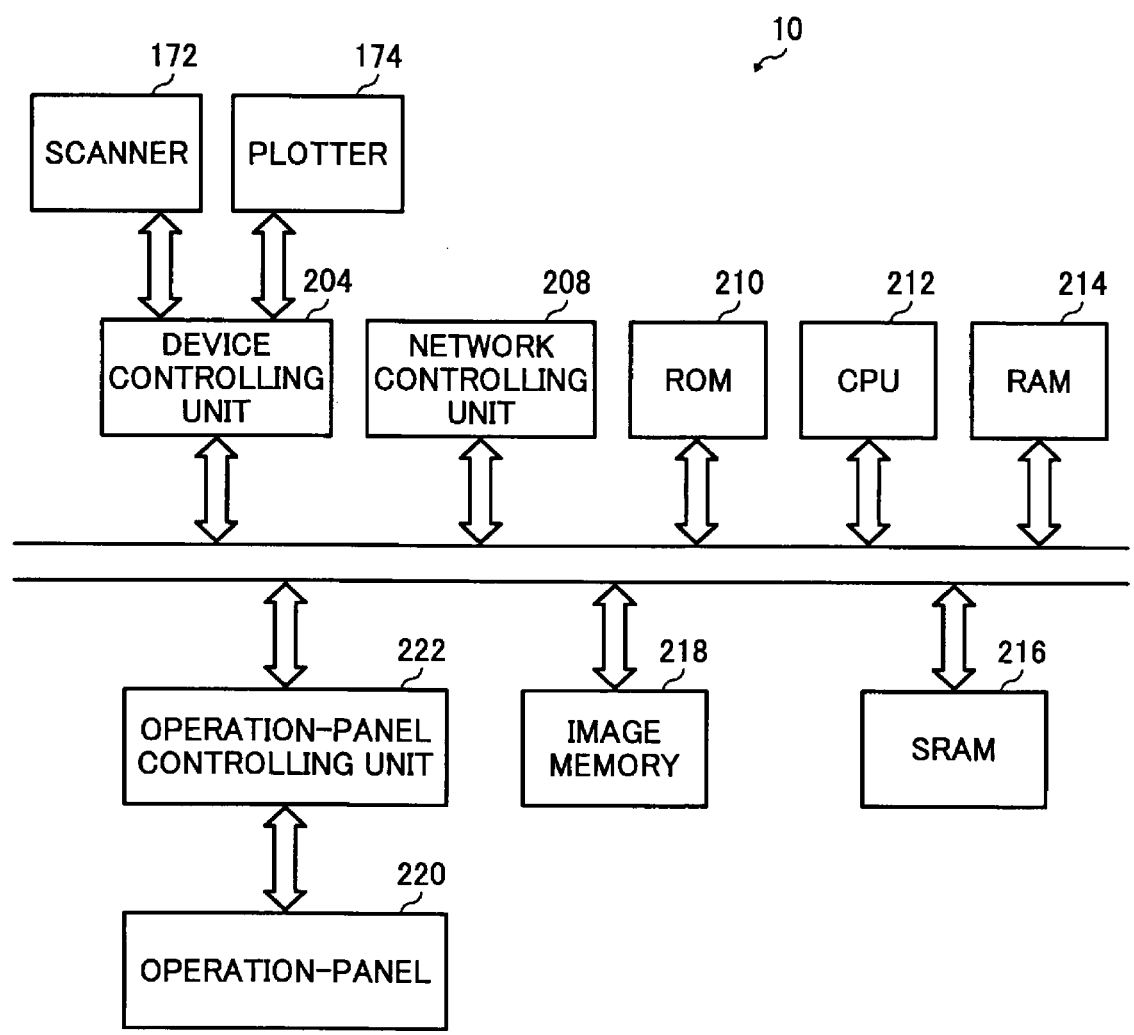
FIG. 10 is a block diagram of a hardware configuration of the MFP.

FIG. 10 is a block diagram of a hardware configuration of the MFP 10. The MFP 10 includes the scanner 172, the plotter 174, a device controlling unit 204 that controls the scanner 172, the plotter 174, and a network controlling unit 208 that connects to a network for communication. The MFP 10 also includes a read only memory (ROM) 210 that stores therein various programs and data, a central processing unit (CPU) 212 that controls each unit of the MFP 10 according to the programs in the ROM 210, a random access memory (RAM) 214 that stores therein data required to control the MFP 10, and a static random access memory (SRAM) 216. The MFP 10 further includes an image memory 218 that retains the image data read by the scanner 172, an operation panel 220, and an operation-panel controlling unit 222 that controls the operation panel 220.

The layer structure of the MFP 10 explained as above can be implemented by computer programs; in other words, computer programs can be executed on a computer to implement the same functions as the MFP 10. The commuter programs are stored in, for example, the ROM 210 and executed by the CPU 212.

According to an aspect of the present invention, it is possible to change each of the functions with ease, and improve reusability.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that performs an image forming process, the image forming apparatus comprising:
    a user interface unit that receives at least one setting condition for the image forming process;
    an application unit that includes a reading component, a printing component, and a document processing component, wherein the image forming process is performed via a combination of the reading component, the printing component and the document processing component;
    a reading device unit that is controlled by the reading component; a printing device unit that is controlled by the printing component;
    a document processing device unit that is controlled by the document. processing component; and
    an editing unit that edits for each component the setting condition received by the user interface unit,
    wherein the editing unit divides the setting conditions into a reading condition, a processing condition, and a printing condition, and transmits each of the setting conditions to the corresponding reading component, the document processing component, and the printing component, respectively, if the setting condition received by the user interface unit is larger than the size of the components.

2. The image forming apparatus according to claim 1, wherein the editing unit further extracts a plurality of sub-conditions from the setting condition received by the user interface unit, each of the sub-conditions corresponding to one of the components, and transmits the extracted sub-conditions to the corresponding components respectively.

3. The image forming apparatus according to claim 1, wherein the user interface unit receives a plurality of setting conditions for the image forming process, and the editing unit combines two or more of the plurality of the setting conditions received by the user interface unit to generate at least one integrated setting condition, the integrated setting condition being adapted to one of components, and transmits the integrated setting condition to the corresponding component.

4. The image forming apparatus according to claim 1, wherein the editing unit combines the setting conditions managed by the user interface unit into at least one integrated setting condition corresponding to one of the components when the setting conditions is smaller than the at least one integrated setting condition.

5. The image forming apparatus according to claim 1, wherein the editing unit receives the setting conditions from the user interface unit, edits the setting conditions into at least one integrated setting condition acceptable to one of the components, and sends edited setting conditions to the corresponding component.

6. The image forming apparatus according to claim 5, wherein the editing unit divides the setting conditions into the at least one integrated setting condition that is acceptable to one of the components when the setting conditions is larger than the at least one integrated setting condition.

7. The image forming apparatus according to claim 5, wherein the editing unit combines the setting conditions into the at least one integrated setting condition that is acceptable to one of the components when the setting conditions is smaller than the at least one integrated setting condition.

8. A method of forming an image on an image forming apparatus that includes multiple functions related to an image forming process, the method comprising:
   receiving, in a user interface unit, at least one setting condition for the image forming process;
   providing an application unit that includes a reading component, a printing component, and a document processing component, wherein the image forming process is performed via a combination of the reading component, the printing component and the document processing component;
   controlling a reading device unit via the reading component;
   controlling a printing device unit via the printing component;
   controlling a document processing device unit via the document processing component; and
   editing, in an editing unit, each component the setting condition received by the user interface unit,
   wherein the editing unit divides the setting conditions into a reading condition, a processing condition, and a printing condition, and transmits each of the setting conditions to the corresponding reading component, the document processing component, and the printing component, respectively, if the setting condition received by the user interface unit is larger than the size of the components.

9. The method according to claim 8, further comprising extracting, in the editing unit, a plurality of sub-conditions from the setting condition received by the user interface unit, each of the sub-conditions corresponding to one of the components, and transmitting the extracted sub-conditions to the corresponding components respectively.

10. The method according to claim 8, wherein the user interface unit receives a plurality of setting conditions for the image forming process, and the editing unit combines two or more of the plurality of the setting conditions received by the user interface unit to generate at least one integrated setting condition, the integrated setting condition being adapted to one of the components, and transmits the integrated setting condition to the corresponding component.

11. The method according to claim 8, wherein the editing unit combines the setting conditions managed by the user interface unit into at least one integrated setting condition corresponding to one of the components when the setting conditions is smaller than the at least one integrated setting condition.

12. The method according to claim 8, wherein the editing unit receives the setting conditions from the user interface unit, edits the setting conditions into at least one integrated setting condition acceptable to one of the components, and sends edited setting conditions to the corresponding component.

13. The method according to claim 12, wherein the editing unit divides the setting conditions into the at least one integrated setting condition that is acceptable to one of the components when the setting conditions is larger than the at least one integrated setting condition.

14. The method according to claim 12, wherein the editing unit combines the setting conditions into the at least one integrated setting condition that is acceptable to one of the components when the setting conditions is smaller than the at least one integrated setting condition.

15. A non-transitory computer-readable medium encoded with a computer program product implemented on a computer for forming an image on an image forming apparatus that includes multiple functions related to an image forming process, the computer program product causing the computer to execute:
   managing, in a user interface unit, at least one setting conditions received from a user for the image forming process;
   specifying, in an application unit that includes a reading component, a printing component, and a document processing component, wherein the image forming process is performed via a combination of the reading component, the printing component and the document processing component;
   controlling, in a plurality of device units, the plurality of components, each of the device units corresponding to one of the components, to edit the setting condition received by the user interface unit, and
   dividing the setting conditions into a reading condition, a processing condition, and a printing condition, and transmitting each of the setting conditions to the corresponding reading component, the document processing component, and the printing component, respectively, if the setting condition received by the user interface unit is larger than the size of the components.

* * * * *